United States Patent [19]

Hund

[11] 4,043,692
[45] Aug. 23, 1977

[54] AXIAL THRUST COLLAR

[75] Inventor: Werner Hund, Esslingen, Germany

[73] Assignee: Spieth-Maschinenelemente GmbH & Co. Kg, Germany

[21] Appl. No.: 729,073

[22] Filed: Oct. 4, 1976

[30] Foreign Application Priority Data

Oct. 4, 1975 Germany .............................. 2544498

[51] Int. Cl.² ................................................ F16B 7/04
[52] U.S. Cl. ..................................... 403/373; 403/370
[58] Field of Search ................................ 403/365-376

[56] References Cited

U.S. PATENT DOCUMENTS 3,664,692   5/1972   Spieth ................................... 403/370

FOREIGN PATENT DOCUMENTS 869,892    3/1953   Germany .............................. 403/372
1,655,628  8/1971   Germany .............................. 403/370

Primary Examiner—Wayne L. Shedd
Attorney, Agent, or Firm—Roylance, Abrams, Berdo & Kaul

[57] ABSTRACT

A collar for axially clamping tools, spacers and the like on a shaft having a smooth portion and a threaded end portion includes an internally threaded attachment ring to fit on the threaded end of the shaft, an adjustment ring adjacent the members to be clamped and tightening screws threaded through the attachment ring and abutting the adjustment ring to axially urge the latter against the clamped members. The attachment and adjustment rings are interconnected by annular flexible connecting portions and an intermediate ring through which the screws freely pass. A second embodiment includes a second intermediate ring and additional connecting portion. A third embodiment includes an outer ring and clamping screws to urge the outer and attachment rings together to improve the grip of the collar on the threaded end of the shaft.

3 Claims, 5 Drawing Figures

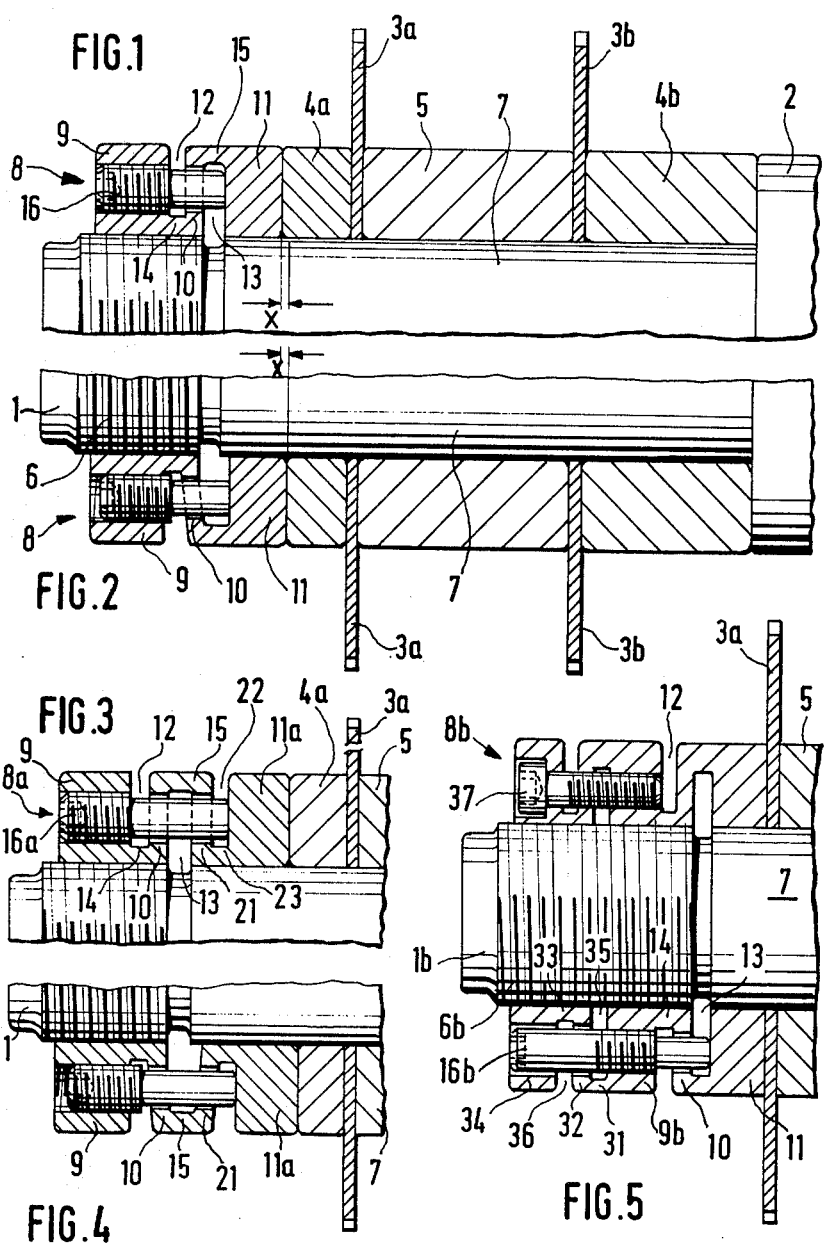

AXIAL THRUST COLLAR

This invention relates to a threaded collar for applying axial clamping force.

BACKGROUND OF THE INVENTION

In the threaded axial clamping collars of the kind shown in the prior art, either the entire inside periphery or the entire outside periphery is provided with threads. Using such a threaded collar a reinforcement of the gripping power, acting in the axial direction, can be achieved on a ring clamped between the threaded collar and another threaded collar or a shoulder or the like beyond the tightening of the threaded collar itself by tightening of tightening screws provided therein. The screws, which are developed as compression screws, stretch the threaded collar in the axial direction during the tightening thereof, as a result of which an increase in the gripping power is produced through screwing on of the threaded collar onto the thread of the part bearing the annular body. In such a structure, it occurs that the clamping path and thus the gripping power is limited because of the thread receiving the adjusting ring and the counter ring and is not sufficient for the clamping of several successively disposed annular bodies such as, for example, saw blades, and of the clamping or spacing pieces disposed in between, and particularly not when the tolerances can be added unidirectionally. The use of the known threaded collar is based on the principle of making the ring as a construction unit per se adjustable and fixable, in order to avoid eccentric forces which would tend to cause a distortion of the shaft receiving the clamping body. An example of this is shown in German Gebrauchsmuster 6,929,904.

In another form of prior art threaded collar, the thread of the peripheral surface is provided only in the area of the outside ring developed as an adjusting ring, and only on the side of the cylinder adjacent to the body that is to be installed. The thread is followed on the peripheral side by a smooth connection between an adjusting ring and an intermediate ring so that the annular groove, provided in the area of the connection, leads to the side of the cylinder facing away from the thread. In the case of such a theaded collar the clamping power, exerted by the adjusting ring of the threaded collar, does not change when the screws are tightened. The bodies that are to be clamped by the threaded collar are to be clamped with the help of the thread in a necessary manner. Whenever the screws are tightened for the fixation of the threaded collar, then the connection lying next to the thread, between the intermediate ring and the adjusting ring, will bend as a result of skewing of the intermediate ring, thus fixing the counter ring firmly in its position. Thus, a change of position, in the use of pulling and pushing screws, will be absorbed by the counter ring alone without any influence on the adjusting ring. Thus, the axial stress, once it is adjusted, will be maintained with the help of the threaded collar. An example of this structure is shown in German Offenlegungsschriften 1,938,448.

BRIEF SUMMARY OF THE INVENTION

An object of the present invention is to develop a threaded collar which is strongly extendable in an axial direction for the purpose of clamping pressure rings between the threaded collar and a shoulder or the like in order to be able to apply great axial compressive force with little expenditure of power.

Briefly described, the invention includes a threaded collar for use with a cylindrical member having a smooth portion and a threaded end portion for axially clamping members carried by said smooth portion, said collar comprising a generally cylindrical body having an axial cylindrical bore therethrough and having inner and outer peripheral surfaces; means in said body for defining a radially inwardly extending annular groove and a radially outwardly extending groove, said grooves being axially spaced apart to define an attachment ring on said body, an intermediate ring between said grooves and an adjusting ring at an end of said body, said intermediate ring having an axial dimension which is significantly smaller than said attachment ring and said adjusting ring, said means including connecting portions at the inner and outer limits, respectively, of said inwardly and outwardly extending grooves interconnecting said rings, said adjusting ring having a distal end surface for contacting the members to be clamped and having a smooth peripheral surface facing the smooth portion of said cylindrical member dimensioned to axially pass the threads on the threaded end portion of said cylindrical member with clearance; substantially continuous thread means on the peripheral surface common to said attachment ring, said intermediate ring and the connecting portion therebetween for engaging the threaded end portion of said body; a plurality of screws having externally threaded portions; means in said attachment ring defining a plurality of internally threaded, circularly spaced, axially extending openings through said attachment ring for receiving said screws and engaging said threaded portions thereof; and means in said intermediate ring defining a plurality of openings axially aligned with said openings in said attachment ring for permitting passage therethrough of said screws, said screws being adjustable in said attachment ring to abut said adjusting ring and to elastically lengthen said body whereby adjustable axial clamping force can be exerted on the members carried by said cylindrical member.

A structure in accordance with the invention results in a capability for substantial axial movement of the adjusting ring as compared with the counter or attachment ring, which maintains its position. In this case, a departure was made from the idea of making the threaded collar fixable within itself and aligned within itself. The fit provided on the adjusting ring opposes its inclination in the case of tightening the threaded collar and, when clamped, with the help of clamping screws. Thus, the feared distortion or buckling of the shaft because of excessive tolerances or variations in the annular pressure bodies to be clamped by the collar does not occur. As will be described, an embodiment is disclosed herein which has substantially increased axially shiftability. A further embodiment provides separate adjustment of the threaded collar and the axial strain to be exerted thereby.

In order that the manner in which the foregoing and other objects are attained in accordance with the invention can be understood in detail, particularly advantageous embodiments thereof will be described with reference to the accompanying drawings, which form a part of this specification and wherein:

FIG. 1 is a side elevation, in longitudinal section, of the upper half of one embodiment of an apparatus according to the invention;

FIG. 2 is a side elevation, in section, of the embodiment of FIG. 1 in a tensioned or clamping state;

FIG. 3 is a side elevation of the upper portion of a second embodiment according to the invention;

FIG. 4 is a side elevation, in partial section of the embodiment of FIG. 3 in a tensioned or clamping state; and FIG. 5 is a side elevation, in section, of a third embodiment according to the invention.

As shown in FIGS. 1 and 2, there is provided a shaft 1 which is provided with an enlarged shoulder portion 2 or similar stop means against which clamping force can be applied. Shaft 1 has a threaded end portion 6 and a smooth arbor portion 7, portions 6 and 7 being separated, in the illustrated case, by an annular groove or recess. Devices to be clamped such as circular saws 3a and 3b or the like are carried by arbor 7 and are separated by annular intermediate spacer elements 4a, 4b and 5, spacer 5 being located between saws 3a and 3b. A threaded collar in accordance with the invention is applied to threaded part 6 and extending over a portion of arbor 7, portions 6 and 7 being concentrically disposed.

Threaded collar 8 includes a counter or attachment ring 9, an intermediate ring 10 and an adjusting ring 11, ring 11 being adjacent to the intermediate spacer piece 4a. Rings 9 and 11 are separated from each other by annular axially spaced grooves 12 and 13 of which groove 13 extends radially outwardly from the inner surface of the body of collar 8 and groove 12 extends radially inwardly from the outer peripheral surface of the body. A connecting portion 14 which interconnects attachment ring 9 with intermediate ring 10 is defined by the bottom or inner limit of annular groove 12. Similarly, an annular connecting part 15 interconnects adjusting ring 11 with intermediate ring 10 and forms the bottom of annular groove 13. Attachment ring 9, connecting part 14 and intermediate ring 10 are provided on their inside peripheral surface with a continuous thread corresponding to and engageable with the externally threaded portion 6 of shaft 1, the collar 8 thus being screwed onto shaft 1. The inside periphery of the adjusting ring 11 is dimensioned to closely fit but pass over the smooth cylindrical portion 7 of shaft 1.

The collar is provided with a plurality of thrust screws 16 which pass through openings circularly spaced around the collar and disposed around a circle which is approximately radially midway of the thickness of the collar. The screws extend axially and are developed as hollow-headed set screws, the threaded portion of which threadedly engages the holes through attachment ring 9. The screws pass through openings in intermediate ring 10 with clearance, the openings in ring 10 being unthreaded and axially aligned with the openings in ring 9. The distal ends of the screws abut the outwardly facing surfaces of adjusting ring 11. Advantageously, a supporting bolt penetrating the intermediate ring with clearance succeeds the threaded part of the thrust screw 16 located in counter ring 9.

The annular bodies which, in this example, are circular saws 3a and 3b and spacer pieces 4a, 4b and 5 which are disposed on the arbor portion of shaft 1 are clamped thereon by screwing the threaded collar 8 onto the threaded part 6 of shaft 1 while fitting the members to be clamped against collar 2 in the axial direction. By tightening thrust screws 16, the intermediate ring 10 is skewed as shown in FIG. 2 as a result of which adjusting ring 11 is caused to move axially away from counter ring 9 so that an elastic force, acting in the axial direction of the shaft, results. This elastic force presses attachment ring 9 against the thread of threaded part 6 and, as a result, causes a lock against rotation which is proportional to the elastic force. As shown in FIG. 2, upon tightening of thrust screws 16, the side of adjusting ring 11 contacting the intermediate spacer ring 4a is moved axially through a clamping distance X. This is sufficient, in order to adjust tolerances adding up in the same direction, of several annular bodies provided between shoulder 3 and threaded collar 8.

In order to be able to apply the threaded collar 8 onto cylindrical part 7 of shaft 1, it is necessary that the diameter of cylindrical part 7 must be at least equal to the outside diameter of the threads on threaded part 6, and is preferably larger. The tighter the fit between adjusting ring 11 and cylindrical part 7 of shaft 1 and the greater the axial length of adjusting ring 11 is, the greater will be the resistance of the adjusting ring to skewing on shaft 1.

Threaded collar 8 can also be provided in the area of the counter or attachment ring and of the intermediate ring with an outside thread, in which case the connecting part 14 is likewise on the outside peripheral surface of threaded collar 8 and the connecting part 15 is on the inside periphery of the threaded collar 8. In this case, the outside periphery of the adjusting ring 11 is developed as the seating area, the diameter thereof being equal to or, preferably, smaller than the core diameter of the thread of attachment ring 9, of connecting part 14 and of intermediate ring 10.

A second embodiment of the invention is shown in FIGS. 3 and 4 wherein the threaded collar, identified in this embodiment as 8a, has an additional intermediate ring 21. Annular groove 13 is between intermediate rings 10 and 21. The two intermediate rings 10 and 21 are interconnected on their outside periphery by connecting part 15. An annular groove 22, which extends radially inwardly from the outer surface of the body, is located between intermediate ring 21 and adjusting ring 11a. The adjusting ring 11a is connected with the intermediate ring 21 by a connecting part 23. The counter ring 9, connecting part 14 and intermediate ring 10 all have an inside thread and the intermediate ring 21, the connecting part 23 and the adjusting ring 11a all have a seating area cooperating on the inside periphery with the cylindrical part 7 of shaft 1. The thrust screws 16a penetrate both intermediate rings 10 and 21 with clearance. Because of the arrangement of the two intermediate rings 10 and 21, there results, as shown in FIG. 3, a greater shifting path of the adjusting ring 11a with respect to counter ring 9 since the two intermediate rings 10 and 21 both assume oblique or skewed positions.

A third embodiment is shown in FIG. 5 wherein the adjusting ring 11 and the intermediate ring 10 correspond to the previously discussed components in FIG. 1. An intermediate ring 32 is provided and is attached to attachment ring 9 by a connecting part 31 disposed on the outside periphery of the body on the side facing away from adjusting ring 11, and intermediate ring 32 is connected with an outside ring 34 by a connecting part 33 disposed on the inside periphery. Between attachment ring 9b and intermediate ring 32 there is an annular groove 35 opening toward the inside periphery, i.e., extending radially outwardly from the inner peripheral surface, and between the intermediate ring 32 and outer ring 34 and annular groove 36 extends radially inwardly from the outer peripheral surface. The components 10, 14, 9b, 32, 33 and 34 are provided with threads on their inside peripheral surfaces which correspond to the threads of the threaded part 6b of shaft 1b. The thrust screws 16b have a head extended from attachment ring 9b to the outside ring 34 which penetrates the intermediate ring 32 and the outside ring 34 with clearance.

One clamping screw 37 is disposed between each two thrust screws 16b, the clamping screw being threadedly connected to the counter or attachment ring 9b and penetrates intermediate ring 32 with clearance and is supported by its head in a countersunk portion of outside ring 34.

In order to fixedly attach annular bodies 3a, 5, etc., which are carried by shaft 1b, threaded collar 8b is screwed onto threaded part 6b of shaft 1b, so that the adjusting ring 11 is located on the cylindrical part 7 of shaft 1b and directly abuts circular saw 3a. The threaded collar 8b is then fixed by means of clamping screws 37, of which, for example, three may be disposed around the body, circularly spaced by an angle of 120°, and counter ring 9b is adjusted with respect to the axis of shaft 1b. Adjusting ring 11 is then shifted while skewing the intermediate ring 10 in the direction toward annular bodies 3a, 5, etc., with regard to their clamping, by tightening of thrust screws 16b, three of which are likewise present and circularly spaced at angles of 120° as measured with respect to the central axis of the shaft, the thrust screws being offset between clamping screws 37 so that each thrust screw is separated from its adjacent clamping screws by an angle of about 60°.

The threaded parts of threaded collars 8a and 8b may, as described in connection with threaded collar 8, be attached to the interior of a tubular member with corresponding change of their constructional shape and with the seating areas thereof on the adjusting rings 11a and 11 also on the outside periphery.

Because of the cylindrical fit between the adjusting ring 11 or 11a of shaft 7, the threaded collars 8, 8a or 8b are centered even while being pushed onto the shaft. The shiftability of the adjusting rings 11 and 11a on the shaft 7 makes a relatively great clamping path, i.e., axial displacement, possible during tightening of the threaded collar 8, 8a or 8b by means of screws 16, 16a or 16b and thus makes possible production of a relatively great axial force on the bodies 3 to 7 that are to be clamped. A milling cutter can be attached, for example, without rotation safely on the shaft. The threaded collar 8, 8a or 8b may also be attached manually, even in the case of apparatus having large dimensions. By tightening the screws 16, 16a or 16b, an increase of the clamping force is achieved at a practically quiescent threaded collar, omitting friction between the threaded collar and the body fitting against it without any great effort. On the basis of the alignment of the threaded collar in relation to the shaft, the force acting from the counter ring on the thread is transferred evenly. When changing the annular bodies, no new centering of the threaded collar is necessary.

While certain advantageous embodiments have been chosen to illustrate the invention, it will be understood by those skilled in the art that various changes and modifications can be made therein without departing from the scope of the invention as defined in the appended claims.

What I claim is:

1. A threaded collar for use with a cylindrical member having a smooth portion and a threaded end portion for axially clamping members carried by said smooth portion, said collar comprising
    a generally cylindrical body having an axial cylindrical bore therethrough and having inner and outer peripheral surfaces;
    means in said body for defining a radially inwardly extending annular groove and a radially outwardly extending groove,
        said grooves being axially spaced apart to define an attachment ring on said body, an intermediate ring between said grooves and an adjusting ring at an end of said body,
        said intermediate ring having an axial dimension which is significantly smaller than said attachment ring and said adjusting ring,
        said means including connecting portions at the inner and outer limits, respectively, of said inwardly and outwardly extending grooves interconnecting said rings,
        said adjusting ring having a distal end surface for contacting the members to be clamped and having a smooth peripheral surface facing the smooth portion of said cylindrical member dimensioned to axially pass the threads on the threaded end portion of said cylindrical member with clearance;
    substantially continuous thread means on the peripheral surface common to said attachment ring, said intermediate ring and the connecting portion therebetween for engaging the threaded end portion of said body;
    a plurality of screws having externally threaded portions;
    means in said attachment ring defining a plurality of internally threaded, circularly spaced, axially extending openings through said attachment ring for receiving said screws and engaging said threaded portions thereof; and
    means in said intermediate ring defining a plurality of openings axially aligned with said openings in said attachment ring for permitting passage therethrough of said screws,
    said screws being adjustable in said attachment ring to abut said adjusting ring and to elastically lengthen said body whereby adjustable axial clamping force can be exerted on the members carried by said cylindrical member.

2. A collar according to claim 1 and further comprising
    means for defining a third annular groove defining a second intermediate ring between and connected to said adjusting ring and the first intermediate ring,
        said second intermediate ring having openings therethrough aligned with said openings in said attachment ring and first intermediate rings to permit passage of said screws,
        said means including a connecting portion between said second intermediate ring and said adjusting ring having a surface aligned with said continuous thread means.

3. A collar according to claim 1 and further comprising
    an outside ring on the end of said body opposite said adjusting ring;
    a second intermediate ring disposed between said outside ring and said attachment ring;
    means for defining inwardly and outwardly extending annular grooves separating said outside, second intermediate and attachment rings and for defining annular connecting portions therebetween;

openings through said outside and second intermediate rings axially aligned with said openings in said attachment ring for permitting passage therethrough of said screws with clearance;

a plurality of clamping screws having enlarged heads and threaded portions;

a second plurality of internally threaded axially extending openings in said attachment rings for receiving said clamping screws in threaded engagement, said second openings being circularly spaced apart in alternating fashion with the first plurality of openings therein;

a plurality of openings axially aligned with said second plurality of openings in said attachment ring, the openings in said outside ring being countersunk to engage said enlarged heads whereby said clamping screws can be tightened to urge said outside and attachment rings toward each other.

* * * * *